United States Patent [19]
Miller

[11] 3,805,361
[45] Apr. 23, 1974

[54] METHOD OF MAKING A VIBRATION DENSITOMETER

[75] Inventor: Charles Eveleigh Miller, Boulder, Colo.

[73] Assignee: International Telephone and Telegraph Corporation, New York, N.Y.

[22] Filed: Feb. 15, 1973

[21] Appl. No.: 332,741

[52] U.S. Cl. .................................. 29/407, 73/32
[51] Int. Cl. ..................... G01n 9/00, B23q 17/00
[58] Field of Search ...... 73/32, 32 A, 30, 1 R, 67.2, 73/70.2; 29/407

[56] References Cited
UNITED STATES PATENTS

| | | | |
|---|---|---|---|
| 3,218,851 | 11/1965 | Spin | 73/32 X |
| 3,677,067 | 7/1972 | Miller et al. | 73/32 |
| 3,706,220 | 12/1972 | Miller | 73/32 |
| 3,713,324 | 1/1973 | Miller et al. | 73/32 |
| 3,738,155 | 6/1973 | Miller | 73/32 |
| 3,741,000 | 6/1973 | Miller | 73/32 |
| 3,769,381 | 11/1973 | Schiatter | 73/32 |

Primary Examiner—Richard C. Queisser
Assistant Examiner—Stephen A. Kreitman
Attorney, Agent, or Firm—A. Donald Stolzy

[57] ABSTRACT

A method of making the temperature sensitivity of a vibrating vane densitometer more or less fit the rate of change of density with respect to temperature of a fluid, the density of which is to be monitored. A densitometer so constructed produces an output signal which accurately varies with the density of fluid when the density change therein is produced partially or solely by a change in temperature.

6 Claims, 9 Drawing Figures

PATENTED APR 23 1974 3,805,361
SHEET 1 OF 2
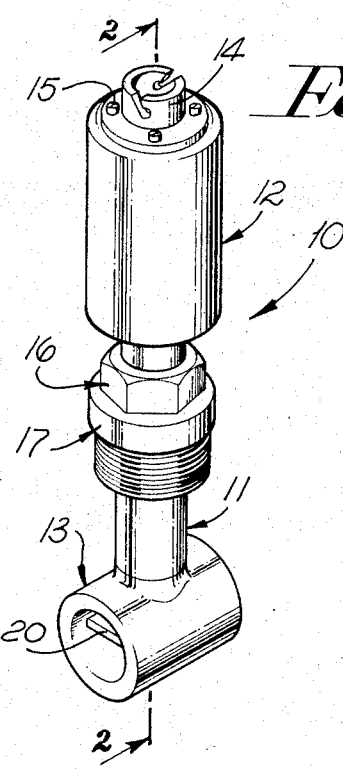
Fig. 1.
Fig. A.
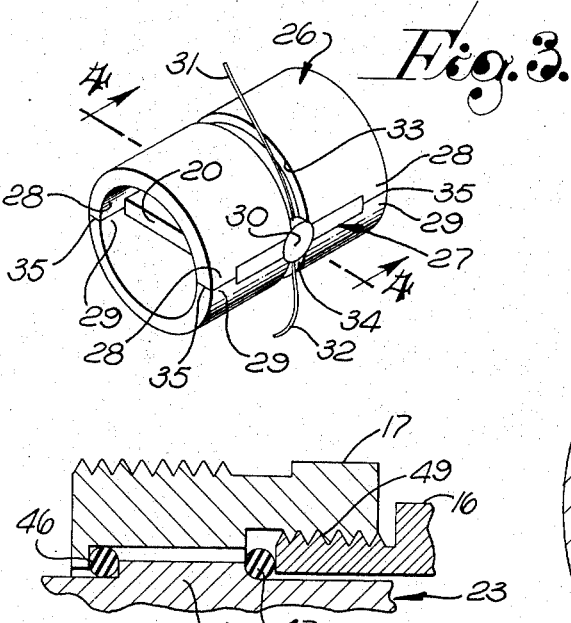
Fig. 3.
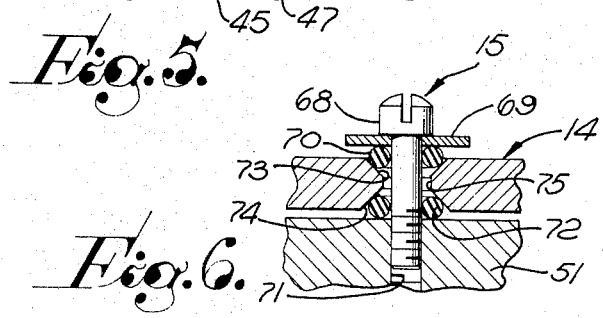
Fig. 5.
Fig. 6.
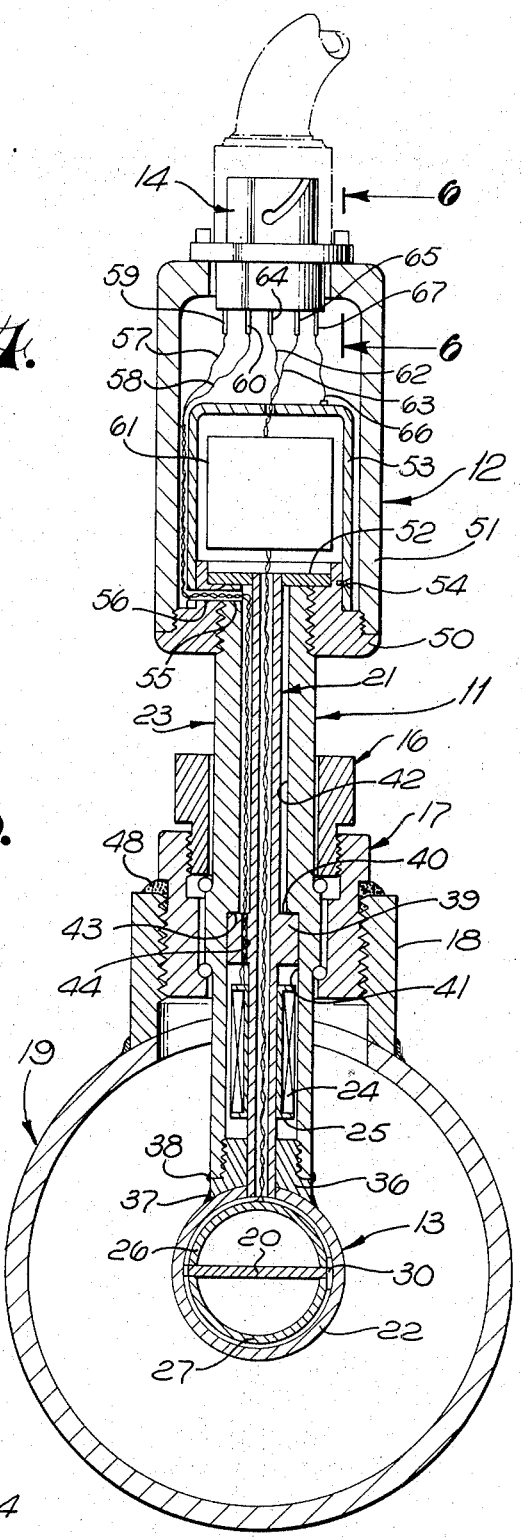
Fig. 2.

METHOD OF MAKING A VIBRATION DENSITOMETER

BACKGROUND OF THE INVENTION

This invention relates to vibration densitometers, and more particularly, to a method of more or less matching the temperature sensitivity of such an instrument with the known rate of change of density with respect to temperature of a known fluid, the density of which is to be monitored.

In the past, the density indication produced by vibration densitometers has been inaccurate at temperatures other than the calibration temperature.

SUMMARY OF THE INVENTION

In accordance with the method of the present invention, the above-described and other disadvantages of the prior art are overcome by cutting off a portion of the rectangular vibrating vane of a vibration densitometer until one dimension thereof is $L_3$ defined by $$L_3 = (-EA)/(CA + D_o')$$

where $D_o'$ is the known rate of change of density with respect to temperature of a known fluid, the density of which is to be monitored. This fluid may or may not be a petroleum product or a compound, solution or mixture.

The factors A, C and E are determined by taking certain measurements.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a perspective view of a densitometer probe constructed in accordance with the present invention;

FIG. 2 is a sectional view of the probe taken on the line 2—2 shown in FIG. 1;

FIG. 3 is a perspective view of a group of component parts of the probe shown in FIG. 1;

FIG. 4 is a transverse sectional view of the assembly taken on the line 4—4 shown in FIG. 3;

FIG. 5 is an enlarged longitudinal sectional view of a portion of the probe shown in FIG. 1;

FIG. 6 is a longitudinal sectional view of a portion of mounting means for an electrical connector otherwise substantially fixed relative to the probe taken on the line 6—6 shown in FIG. 2;

DESCRIPTION OF THE PREFERRED EMBODIMENT

Figure 7:
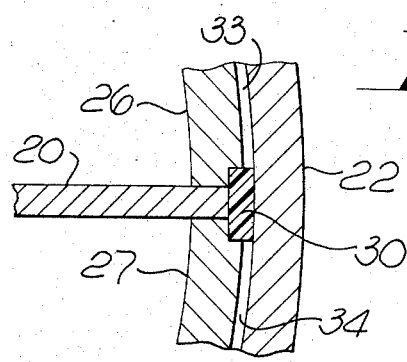
FIG. 7 is a broken away enlarged sectional view of a portion of FIG. 2.

FIGS. 1 to 6, inclusive, and the description thereof are identical corresponding parts of U.S. Pat. No. 3,677,067. By this reference hereto, the entire contents of this patent is hereby incorporated herein as though fully set forth hereat.

In FIG. 1, a densitometer probe 10 is illustrated having a shank 11, a housing 12 at its upper end, a tubular assembly 13 at its lower end and an electrical connector assembly 14 at the upper end of housing 12 fixed thereto by bolts 15. Annular fittings 16 and 17 extend around shank 11 for mounting probe 10 in a hollow cylindrical extension 18 of a pipeline 19, as shown in FIG. 2.

As shown in FIGS. 1 and 2, a stainless steel vane 20 is mounted in assembly 13 in a position perpendicular to the axis of a hollow cylindrical magnetostrictive inner tube 21. Vane 20, if desired, may be also mounted in a symmetrical position with respect to the axis of an outer sleeve 22 which houses it.

Vane 20 may be a rectangular plate having flat and parallel upper and lower surfaces as shown in FIG. 2, and may otherwise have mutually normal surfaces forming a right parallelopiped.

Shank 11 not only includes inner tube 21, but an outer magnetic tube 23. A driver coil or solenoid winding 24 wound on a nylon bobbin 25 is press fit onto the external surface of inner tube 21 and located in a space between the tubes 21 and 23 toward the lower end of shank 11. Coil 24 is thus maintained in a substantially fixed position on inner tube 21, although the same is not necessarily critical.

Vane 20 is supported between two half cylinders 26 and 27 as shown in FIGS. 2 and 3. The longitudinal edges of vane 20 are pressed together between half cylinders 26 and 27 with a pressure of, for example, 20,000 pounds per square inch because the assembly shown in FIG. 3 is inserted in sleeve 22 with an interference fit, sleeve 22 being heated prior to the said insertion.

Half cylinder 26 has four projections 28, and half cylinder 27 has four projections 29. Projections 28 and 29 serve to prevent longitudinal movement of vane 20 between half cylinder 26 and half cylinder 27 although the same is not likely due to the clamping pressure on vane 20 between half cylinder 26 and half cylinder 27. As will be explained, projections 28 and 29 may be eliminated.

Half cylinders 26 and 27, and vane 20 may be machined to have a flat or recess to receive a piezoelectric crystal 30. Crystal 30 has electrical leads 31 and 32 which extend around half cylinders 26 and 27 in grooves 33 and 34, respectively, to a point where they enter the hollow interior of inner tube 21. This entry is made at the lower end of inner tube 21, as shown in FIG. 2.

As shown in FIG. 3, projections 28 and 29 may have a slight separation at 35 to insure that the pressure contact of half cylinders 26 and 27 on vane 20 is quite high due to the said interference fit.

As shown in FIG. 2, a boss 36 is welded at 37 to sleeve 22 in a fluid tight manner. Although the probe 10 need not always be fluid tight throughout, a glass-to-metal seal or other seal may be provided inside inner tube 21 for leads 31 and 32. Before the said interference fit is provided, if desired, crystal 30, and those portions of leads 31 and 32 in grooves 33 and 34, respectively, may be potted with an epoxy. Further, after the interference fit has been effected, the entire unit when completely assembled may be treated further by applying a bonding agent around all of the structures inside sleeve 22. Any conventional bonding process may be employed including, but not limited to, the application of a bonding agent sold under the name of "Locktite."

As stated previously, boss 36 may be welded to sleeve 22 at 37 in a fluid tight manner. Further, outer tube 23 may be threaded onto boss 36 and welded thereto at 38 in a fluid tight manner. For all practical purposes, boss 36 may thus be considered an integral part of outer tube 23. Boss 36, for example, is also made of a magnetic material. All of the "magnetic materials" referred to herein may be any magnetic material including, but not limited to, stainless steel. However, inner tube 21, although being magnetic, must also be magnetostrictive. Notwithstanding this limitation, it is to be noted that inner tube 21 is employed to produce vibration, and if one feature of the present invention is used without another, the use of a magnetostrictive or magnetic material may not be required, and the invention still practiced.

Inner tube 21 has an annular projection 39 with a shoulder 40. Outer tube 23 has a lower bore 41 separated from a smaller upper counter bore 42 by an annular shoulder 43. Shoulders 40 and 43 abut. From shoulder 40 to the lower end of inner tube 21, inner tube 21 is always in axial compression. That is, inner tube 21 is in compression when coil 24 is energized and tube 21 is also in compression when coil 24 is deenergized. Coil 24 is energized with a level shifted alternating current which thus merely changes the degree of compression of inner tube 21.

Projection 39 has a hole 44 through which the electrical leads of coil 24 can pass from the location of coil 24 upwardly between tubes 21 and 23.

The manner in which probe 10 is mounted in pipeline 19 is better illustrated in FIG. 5. In FIG. 5, note will be taken that outer tube 23 has an outwardly extending radial projection 45 on each side of which rubber O-rings 46 and 47 are compressed by fittings 16 and 17. Fitting 17 is threaded into extension 18 and sealed thereto by a conventional sealing compound 48 shown in FIG. 2. In FIG. 5, note will be taken that fitting 16 is threaded inside fitting 17 at 49. The amount O-rings 46 and 47 are compressed is, therefore, determined by the position of fitting 16. That is, fitting 16 is turned, for example, by a wrench, until the desired O-ring compression is reached.

From the construction illustrated in FIG. 5, note will be taken that only O-rings 46 and 47 contact outer tube 23, and that, therefore, shank 11 is never touched by either fitting 16 or fitting 17. This, as well as many other constructions disclosed herein, may or may not be employed, as desired.

The construction of probe 10 is such that the leads from coil 24 are kept magnetically separate from the leads from crystal 30. This is true through a portion of housing 12 as will be described. Housing 12 has a fitting 50 threaded onto outer tube 23. A cylinder 51 is threaded to fitting 50. A washer 52 is press fit and thereby fixed in fitting 50. Inner tube 21 has an upper end which may be fixed relative to or slidable in washer 52, as desired. However, preferably the external surface of inner tube 21 at its upper end fits contiguous to the surface of washer 52 defining the hole therethrough. A shield 53 made of a magnetic material may be fixed around fitting 50 by one or two or more screws 54. Outer tube 23 has a radial hole 55 therethrough through which the leads from coil 24 pass. Fitting 50 has a hole 56 therethrough in alignment with hole 55 through which the leads from coil 24 pass. From the outward radial extremity of hole 56, the coil leads indicated at 57 and 58 pass upwardly between cylinder 51 and shield 53 and are connected to pins 59 and 60 of the electrical connector 14. Electrical connector 14 may be a conventional five pin connector.

As stated previously, the leads 31 and 32 from crystal 30 extend upwardly through the interior of inner tube 21. At the upper end of inner tube 21, as shown in FIG. 2, leads 31 and 32 are connected to the input of differential amplifier 61. Leads 31 and 32 thus extend outwardly through the upper opening in inner tube 21.

Differential amplifier 61 may be entirely conventional, and mounted on a conventional card, if desired. Amplifier 61 may be supported inside shield 53 by any conventional means, if desired, or simply supported by the strength of leads 31 and 32, and output leads 62 and 63 which are connected to pins 64 and 65 of connector 14, respectively. A lead 66 provides a ground connection from shield 53 to the fifth pin 67 of connector 14.

The manner in which connector 14 is mounted on cylinder 51 is shown in FIG. 6. Only one bolt 15 is shown in FIG. 6 since all bolts 15 are similarly situated. In FIG. 6, bolt 15 situated. shown having a head 68, a washer 69 under head 68, an O-ring 70 under washer 69, and a shank 71 threaded into cylinder 51. A second O-ring 72 also extends around screw shank 71. O-ring 70 fits between the lower surface of washer 69 and a counter sunk frusto-conical hole 73 in connector 14. O-ring 72 fits between the upper surface of cylinder 51 and another counter sunk frusto-conical hole 74 in connector 14. Holes 73 and 74 are connected by a bore 75. From FIG. 6, it will be noted that all the structures shown therein may vibrate, but that the amount of vibration transmitted to connector 14 may be quite small. However, again this structure is optional.

An enlarged sectional view otherwise identical to a portion of FIG. 2 is shown in FIG. 7.

Figure 8:
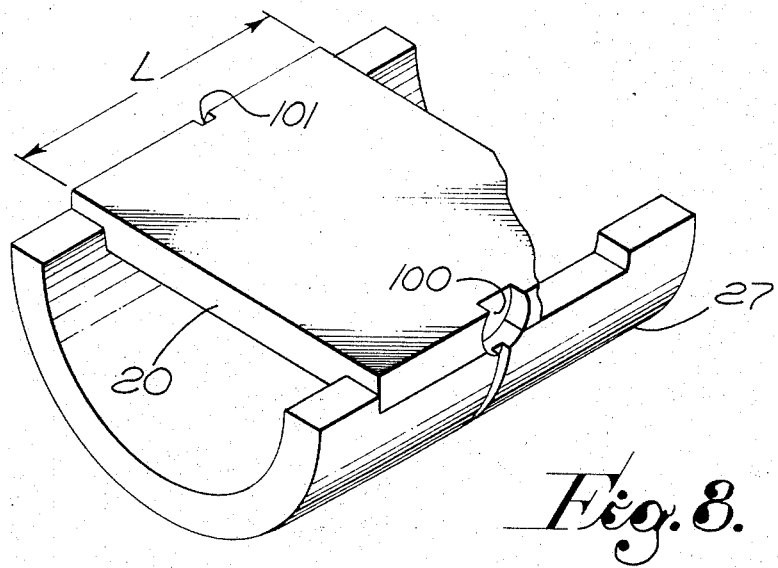
FIG. 8 is a broken away perspective view of a subassembly of two parts shown in FIG. 3.

FIG. 8 is a perspective view of only vane 20 and half cylinder 27 assembled. Half cylinder 26 may be identical to half cylinder 27, if desired. In FIG. 8, note will be taken that half cylinders 26 and 27 are formed and fitted to provide a recess 100 which may, for example, be cylindrical. Crystal 30 thus fits into recess 100. Grooves 33 and 34 communicate with recess 100. Vane 20 in FIG. 8 has a groove 101 which lies in alignment with grooves 33 and 34.

The method of the present invention concerns cutting off vane 20 to reduce the dimension L thereof as shown in FIG. 8. This may be done with a densitometer identical to that shown in the said patent. However, in some cases the structure shown in FIG. 9 may be more desirable.

In the case of the structure shown in FIGS. 1 to 8, inclusive, it may be necessary to use an end mill or grinder to reduce L. A lathe may also be used for this purpose. The edges of the vane 20 might thus be left in tack while L of the portion of vane 20 inside half cylinders 26 and 27 is reduced. However, preferably these edges are not left in tack.

The phrase "reducing L" or the like may or may not be defined by cutting off the end of a vane such as one of the vanes 20 and 20'.

Figure 9:
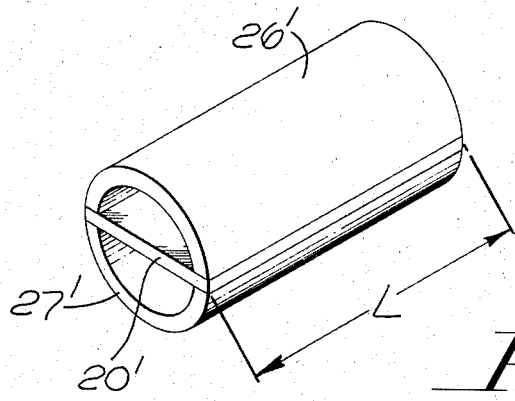
FIG. 9 is a perspective view of three parts which may be substituted for the corresponding ones shown in FIG. 3.

In FIG. 9, L may be reduced simply by taking an outside cut at one end with a lathe. The densitometer employing the structure of FIG. 9 may be identical to that shown and/or described in said patent with half cylinders 26' and 27', and vane 20' substituted for half cylinders 26 and 27, and vane 20, respectively. A recess and grooves could be provided in the structure of FIG. 9 (not shown for clarity) identical to recess 100 and grooves 33, 34 and 101, if desired. The flat end faces of 20', 26' and 27' could then be flush with each other and with the flat end faces of a sleeve corresponding to sleeve 22. In other words, the said corresponding sleeve would have a dimension the same as that of the L shown in FIG. 9.

Note will be taken that L may be reduced by machining or otherwise removing a portion of the material of vanes 20 or 20' by any conventional equipment. The work "cutting" in any of its grammatical forms, is, therefore, hereby defined for use herein and in the claims to mean the removal of material by any means.

When a lathe is employed to make an outside cut, the construction shown in FIG. 9 may be useful because the said corresponding sleeve and parts 20', 26' and 27' may be cut off at the same end to reduce the common dimension L of all four by the same amount.

Note will be taken that when an outside cut is taken by a lathe, it is advantageous to use the embodiment of FIG. 9 over that of FIGS. 1 to 8 because it is necessary to remove substantial portions of half cylinders 26 and 27, and sleeve 22 at one end thereof to reach vane 20 because vane 20 is shorter than the former. This is not the case with the embodiments of FIG. 9 because the sleeve and half cylinders 26' and 27' are all the same length as vane 20'.

In accordance with the present invention, two equations have been discovered which adequately explain the behavior of a densitometer of the type disclosed in said patent. These two equations are:

$$D = -AF + B \quad (1)$$

and $$f' = C + (E/L) \quad (2)$$

where $D$ is the density of the fluid in which vane 20 or vane 20' is immersed, $f$ is the natural resonant frequency at which the vane vibrates, $A, B, C$ and $E$ are constants, and $$f' = df/dT \quad (3)$$

where $T$ is temperature.

In accordance with the present invention, the vane has successively smaller dimensions $L = L_1$, $L = L_2$ and $L = L_3$ at three successively later points in time. The constant $A$ may be determined either when $L = L_1$ or $= = L_2$, but preferably is determined when $L = L_2$.

The constant $A$ is determined by immersing the vane in first and second fluids of different but known densities $D_1$ and $D_2$, and measuring $f = f_1$ when $D = D_1$ and $f = f_2$ when $D = D_2$. The constant $A$ is then defined by $$A = (D_2 - D_1)/(f_1 - f_2) \quad (4)$$

The first and second fluids must be different from each other but may otherwise include air, water, a vacuum or any fluid described hereinbefore or hereinafter or otherwise.

If $L_1$ is the initial $L$, while $L = L_1$, frequency $f = f_3$ is measured at temperature $T_3$, and $f = f_4$ is measured at temperature $T_4$, where $T_3$ and $T_4$ are different temperatures. The fluid and/or densitometer may be heated or cooled or both, in succession, to arrive at $T_3$ or $T_4$. If desired, one of the temperatures $T_3$ and $T_4$ may be ambient. The vane, in this case, may be immersed in a third fluid which may be the fluid to be monitored, air, water or any other fluid including, but not limited to, one of the first and second fluids or any other fluid disclosed hereinbefore or hereinafter. From the foregoing, the following can be written:

$$f_1' = C + (E/L_1) \quad 5.$$

where, $$f_1' = (f_4 - f_3)/(T_4 - T_3) \quad 6.$$

The next step in accordance with the present invention is to reduce dimension $L$ from $L_1$ to $L_2$. After this reduction, with the vane in a fourth fluid, $f = f_5$ is measured at temperature $T_5$ and $f = f_6$ is measured at temperature $T_6$. Thus, $$f_2' = C + (E/L_2) \quad 7.$$

where, $$f_2' = (f_6 - f_5)/(T_6 - T_5) \quad 8.$$

The fourth fluid may be any fluid mentioned hereinbefore or hereinafter.

The word "fluid" is hereby defined for use herein and for use in the claims to mean any fluid including a vacuum.

Note that equations (5) and (7) may be solved simultaneously for $C$ and $E$ as follows:

$$C = (L_1 f_1' - L_2 f_2')/L_1 - L_2) \quad 9.$$
$$E = [L_1 L_2 (f_2' - f_1')]/(L_1 - L_2) \quad 10.$$

From equation (1), $$dD/dT = -A (df/dT) \quad 11.$$

If $$D' = dD/dT \quad 12.$$

and $D_o'$ is the known rate of change of density with respect to temperature of a known fluid, the density of which is to be monitored, then set $$f' = -D_o'/A \quad 13.$$
$$L = L_3 \quad 14.$$

in equation (2). Then, solve the equation for $L_3$ as follows:

$$L_3 = (-EA)/(CA + D_o') \quad 15.$$

The next step in accordance with the present invention is to reduce $L$ from $L_2$ to $L_3$ as defined in equation (15).

Note will be taken that the $C$ and $E$ of (15) are defined by (9) and (10), respectively. Moreover, the constant $A$ of (15) is defined in (4). The value for $D_o'$ may be determined from any suitable handbook or table. Alternatively, the $D_o'$ of a fluid in question may be accurately or approximately measured in the laboratory or otherwise by any known method.

From (10) it will be observed that $L_3$ in (15) is positive when the algebraic signs of $E$ and $(CA + D_o')$ are opposite. From (1) and (4) it also can be seen that $A$ in (15) is always positive. In (1), $f$ and $B$ are always positive, too. The term $D_o'$ is always negative because fluids expand and undergo a decrease in density with increased temperature.

Incidentally, $f'$ is always positive because it is known that $D_o'$ is always negative and A is always positive in (13).

The phrase "to indicate" in any of its grammatical forms is hereby defined for use herein and for use in the claims to mean to provide an output approximately proportional to vane frequency and/or fluid density whether or not indicated visually. The phrase "to indicate" thus may or may not describe the function of a densitometer which can be used to indicate density visually or a densitometer constructed for use in or used in a process controller, a total mass flowmeter or otherwise.

Two alternatives to the present invention reside in electron beam welding of either one or both of half cylinders 26 and 27 to vane 20 with or without the said interference fit or a press fit. Either one or both of half cylinders 26' and 27' may or may not be electron beam welded to vane 20' with or without the said interference fit or a press fit, as desired.

One or more fluids mentioned hereinbefore and hereinafter may or may not be the same as another one or more thereof, as desired.

Temperatures $T_3$ and $T_4$ may or may not be identical to temperatures $T_5$ and $T_6$, respectively.

When L is reduced from $L_1$ to $L_2$ and from $L_2$ to $L_3$, the vane may be shaved from either end for either reduction. That is, the reduction from $L_1$ to $L_2$ may be accomplished by shaving either vane end and the reduction from $L_2$ to $L_3$ may be made by shaving either one of the vane ends regardless of which end was shaved for the $L_1$ to $L_2$ reduction.

The vane resonant frequency, $f$, may easily be measured by connecting a conventional frequency meter either to the output of the tracking filter or to the output of the power amplifier or at other points in the apparatus disclosed in the said patent. Further, the frequency, $f$, may be measured in any way.

What is claimed is:

1. The method of making a density indicating instrument, said method comprising the steps of: constructing a vibration densitometer with a rectangular vane; immersing said vane in first and second fluids of different known densities $D_1$ and $D_2$ while said fluids are at the same temperature, said densitometer being of the type that sustains vibration of said vane at a resonant frequency which is a function of density, said densitometer including a probe, said vane having one pair of parallel edges fixed relative to said probe; measuring the resonant frequencies $f_1$ and $f_2$ of said vane when said vane is immersed in said first and second fluids, respectively, as aforesaid, the density D of fluid at a constant temperature being a function of the resonant frequency $f$ of said vane such that the following equation gives D approximately in terms of $f$:
$D = -AF + B$
where,
$A = (D_2 - D_1)/(f_1 - f_2)$
and B is a constant, the rate of change of frequency $f$ with respect to temperature T being given approximately by
$f' = C + (E/L)$
where,
$f' = df/dT$,
where C and E are constants, and L is one dimension of said vane measured in the direction of said one pair of parallel edges thereof, said vane being initially constructed with said one dimension equal to $L_1$; measuring $f = f_3$ at a first temperature $T_3$ while said vane is immersed in a third fluid; measuring $f = f_4$ at a second temperature $T_4$ different from $T_3$ while said vane is immersed in said third fluid; cutting off a portion of said vane to reduce $L_1$ to $L_2$; measuring $f = f_5$ at a third temperature $T_5$ while said vane is immersed in a fourth fluid; measuring $f = f_6$ at a fourth temperature $T_6$ while said vane is immersed in said fourth fluid; and cutting off a portion of said vane to reduce $L_2$ to $L_3$, where
$L_3 = (-EA)/(CA + D_o')$
where,
$E = [L_1 L_2 (f_2' - f_1')]/(L_1 - L_2)$
$C = (L_1 f_1' - L_2 f_2')/(L_1 - L_2)$
$f_1' = (f_4 - f_3)/(T_4 - T_3)$
$f_2' = (f_6 - f_5)/(T_6 - T_5)$
and $D_o'$ is the known rate of change of density with respect to temperature of a fluid to be monitored, the use of said densitometer to indicate the density of said predetermined fluid being less sensitive to temperature because of the use of said vane of a dimension $L_3$ as defined hereinabove.

2. The invention as defined in claim 1, wherein said first and second fluids are air and water, respectively, said third and fourth fluids both being air, $T_5$ being equal to $T_3$, $T_6$ being equal to $T_4$, $f_1$ and $f_2$ being measured when said one vane dimension is one of the dimensions $L_1$ and $L_2$.

3. The invention as defined in claim 2, wherein $f_1$ and $f_2$ are measured while said one vane dimension is $L_1$.

4. The invention as defined in claim 2, wherein $f_1$ and $f_2$ are measured while said one vane dimension is $L_2$.

5. The method of making a density indicating instrument, said method comprising the steps of: constructing a vibration densitometer having a vibratable structure with a resonant frequency $f$ such that approximately
$D = -AF + B$
where D is the density of any fluid in which said structure is immersed, $f$ is the said resonant frequency at said density D, and A and B are constants, the densitometer being constructed to make
$df/dT = -D_o'/A$
where T is temperature, and $D_o'$ is the known rate of change of density with respect to temperature of a fluid, the density of which is to be monitored, said densitometer having an output which accurately follows the density variations of said known fluid with temperature.

6. The invention as defined in claim 5, wherein said densitometer includes a probe, said vibratable structure including a rectangular vane fixed relative to said probe along one pair of parallel vane edges, the term $df/dT$ being changed by cutting off at least one vane end to shorten said vane in the direction of said edges thereof until
$df/dT = -D_o'/A$.

* * * * *